Sept. 13, 1960 J. G. PORTER, JR 2,952,608
DEOILING PROCESS
Filed March 8, 1956 2 Sheets-Sheet 1
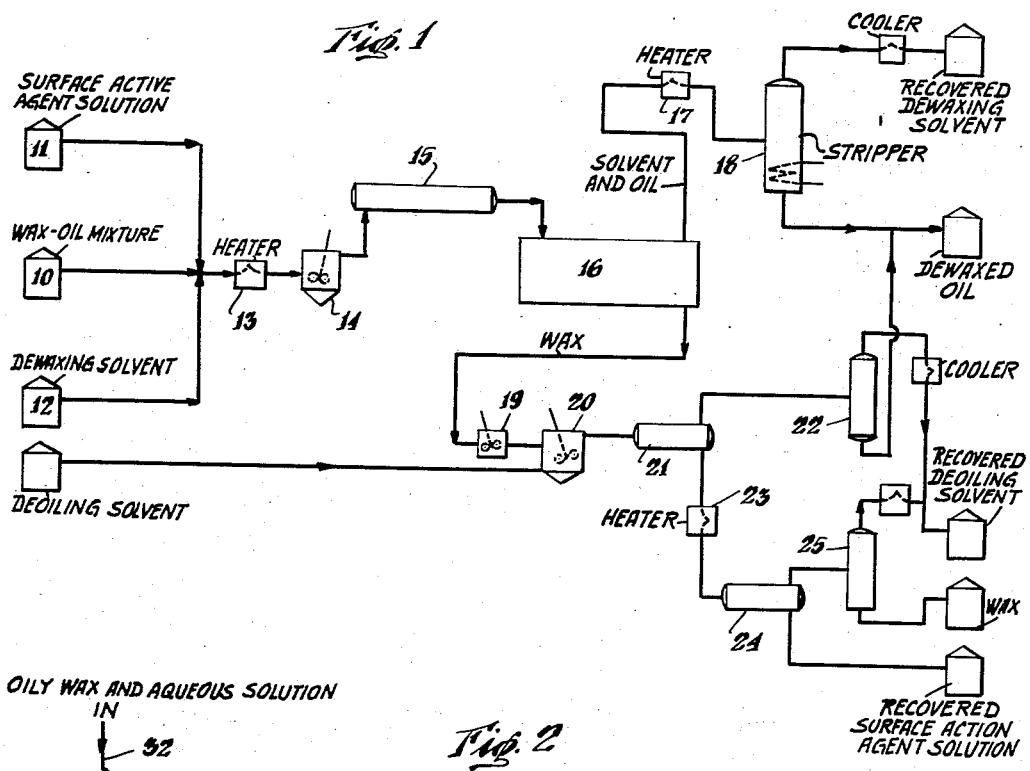
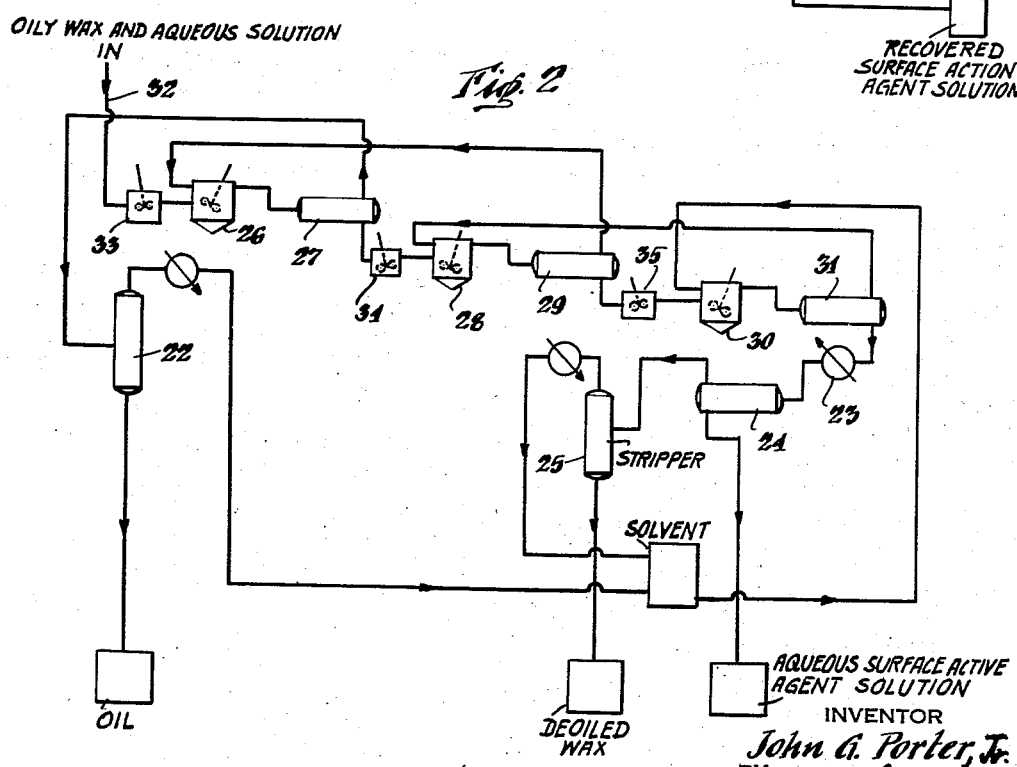
INVENTOR
John G. Porter, Jr.
BY
Andrew L. Gabriault
ATTORNEY Sept. 13, 1960   J. G. PORTER, JR   2,952,608
DEOILING PROCESS
Filed March 8, 1956   2 Sheets-Sheet 2

INVENTOR
John G. Porter, Jr.
BY
Andrew L. Gabriault
ATTORNEY

Patent 2,952,608

2,952,608

DEOILING PROCESS

John G. Porter, Jr., Pitman, N.J., assignor to Socony Mobil Oil Company, Inc., a corporation of New York Filed Mar. 8, 1956, Ser. No. 570,252

5 Claims. (Cl. 208—29)

This invention relates to the separation of wax-oil mixtures and is particularly concerned with the removal of oil from a mixture containing oil, wax and an aqueous solution.

In U.S. Patent No. 2,645,597, there is described a process for dewaxing wax-containing oils, wherein the waxy oil is contacted with an aqueous solution of a surface active agent, which solution contains also a material that prevents freezing of the aqueous solution at the dewaxing temperatures. In this process, the wax is selectively wet by the aqueous solution, so that the separation of the wax-containing aqueous phase from the dewaxed oil phase can be effected in conventional towers or settling vessels.

Operation of the process to produce suitably dewaxed oils normally yields a wax-containing aqueous phase that has occluded therein substantial quantities of oil. The subsequent concentration of the wax from this wax-containing aqueous phase produces a wax that contains undesirable amounts of oil. In accordance with the practices of the prior art, such wax was immediately subjected to a treatment with a suitable deoiling solvent to dissolve the oil out of the wax-containing aqueous phase.

In the most efficient operation of the above-described dewaxing process, the wax-containing aqueous phase occurs as an aggregate of wax-bearing aqueous solution droplets and the region among the droplets is filled with dewaxed oil in a continuous phase. It has now been discovered that, other factors remaining constant, a substantially greater degree of deoiling can be achieved when the wax-bearing aqueous solution in the wax-containing aqueous phase that is subjected to the deoiling treatment is the continuous phase. It is possible in the dewaxing process to produce a wax-containing aqueous phase in which the wax-bearing aqueous solution is the continuous phase by variations in the concentration of the surface active agent. Such variations, however, affect adversely the dewaxing efficiency.

It has now been found that the oil content of the wax obtained in the process described in U.S. Patent No. 2,645,597 can be materially reduced by subjecting the wax-containing aqueous phase to controlled agitation before treatment with a deoiling solvent.

Accordingly, it is a broad object of this invention to efficiently deoil the wax that is obtained from a mixture containing wax, oil and an aqueous solution.

A more specific object is to efficiently deoil the wax that is associated with an aqueous solution that is dispersed in a continuous dewaxed oil phase.

A very specific object is to efficiently deoil the wax that is obtained from the process described in U.S. Patent No. 2,645,597.

Broadly stated, the present invention provides a process for effectively deoiling the wax that is present in a dispersion in which wax particles are associated with droplets of an aqueous solution dispersed in a continuous oil phase, which comprises subjecting said dispersion to agitation to produce a mixture in which the aqueous solution is the continuous phase and the oil phase is the dispersed phase, subjecting said mixture to treatment with a deoiling solvent to produce a mixture of deoiled wax, aqueous solution and an oil-deoiling solvent solution, separating the deoiled wax and aqueous solution from the oil-deoiling solvent solution and separating deoiled wax from the aqueous solution.

The invention will be best understood in connection with the drawings, in which

Figure 1 is a diagrammatic flow plan of a process combining the surface active agent dewaxing process of U.S. Patent No. 2,645,597 with the deoiling process of the invention;

Figure 2 is a diagrammatic flow plan illustrating a variation in the deoiling process of this invention.

In all of these drawings like parts bear like numerals.

Figure 3:
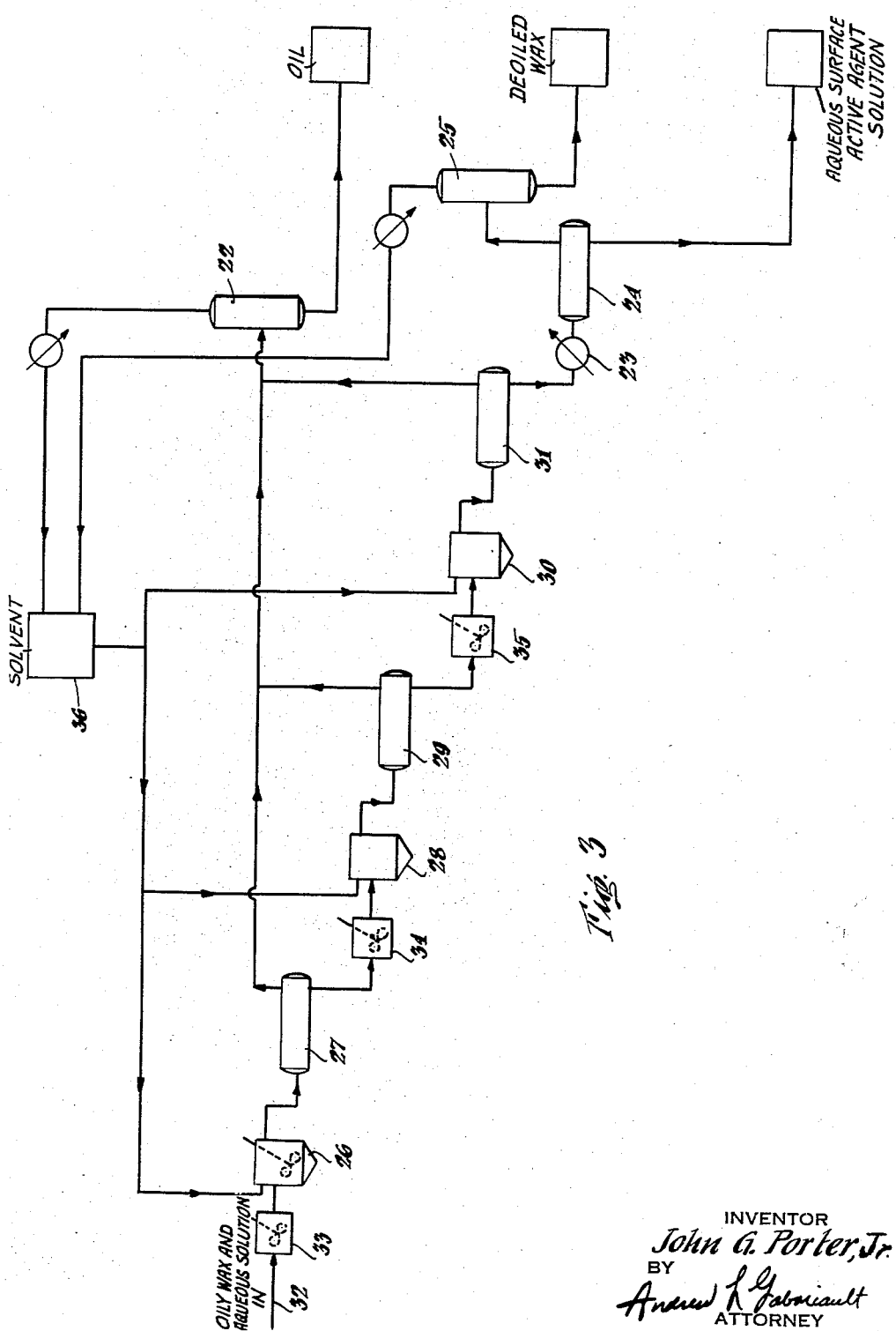
Figure 3 is a diagrammatic flow plan illustrating a further variation in the process of this invention.

Referring to Figure 1, a wax-oil mixture stream 10 is combined with an aqueous solution of a surface active agent 11 and a dewaxing solvent 12.

U.S. Patent No. 2,645,597 describes the types of surface active agents and the make-up of the solution in which they may be dissolved.

Briefly, suitable surface active agents are those which give a finite three-phase contact angle which can be measured by the bubble machine test. [Engineering and Mining Journal, 137, 291 (1936).] Illustrative of specific surface active agents which may be used are the alkali metal wax aromatic sulfonates and the alkali metal wax oxyaromatic sulfonates.

The surface active agent is dissolved in water in concentrations within the range about 0.01 percent to 10 percent based on the weight of the oil-containing wax or wax-containing oil charge. There is added to the water a miscible material suitable to prevent freezing thereof at the reduced temperature at which the dewaxing is conducted. Suitable materials for this purpose include ethylene glycol, sodium chloride and glycerine.

The surface active agent solution may be utilized in amounts varying from 1 percent to 200 percent of the weight of the oil charge.

The use of a dewaxing solvent is not essential to the operation of the dewaxing process but is frequently desirable to increase the fluidity of the charge. Suitable solvents are completely miscible with the charge but immiscible with water and are poor solvents for wax. Examples of such solvents include various light hydrocarbons, methyl-ethyl ketone, ethylene dichloride and the like, as well as mixtures thereof. Generally, the solvent is added in concentration of from 0.5:1 to 20:1 volume of solvent per volume of charge.

Returning to Figure 1, the aqueous surface active agent solution, solvent and charge are heated in heater 13 to about 110° F. and then agitated by a mixer 14 to produce a dispersion of the aqueous solution in the waxy oil-solvent solution. This dispersion is then fed to a chiller 15, wherein the dispersion is cooled to the dewaxing temperature, normally about 0° F., to precipitate the wax. A screw chiller has been found suitable for this operation. The effluent from chiller 15 is fed to a settler 16, wherein the aqueous solution and wax settle together and separately from the solvent-dewaxed oil solution. Depending upon the solvent used, the dewaxed oil-solvent solution may be either the upper or lower layer. In either case, however, the wax-containing aqueous phase exists as droplets of aqueous solution, to the exterior of which are attached particles of wax. The region among the droplets is filled by dewaxed oil-solvent solution as the continuous phase. The droplets may exist entirely suspended in the oil or all or any portion of the droplets may touch or even rest upon one another.

The solvent-dewaxed oil solution is removed from settler 16, heated in heater 17, and solvent is stripped from the oil in stripper 18. The recovered solvent may be recycled and re-used in the process by returning it to stream 12, if desired.

In accordance with the process of the present invention the wax-containing aqueous phase, in need of deoiling, passes from settler 16 and is then agitated sufficiently at 19 to cause the aqueous solution to assume the continuous phase and the dewaxed oil-solvent solution becomes the dispersed phase. This agitation can be furnished by a propeller-type mixer, but any type of agitator will do, including line mixers and even pumps.

After the aqueous solution has assumed the continuous phase, the wax-containing aqueous phase is contacted in mixer 20 with a deoiling solvent. Mixer 20 is used solely to effect contact between the aqueous phase and the solvent. The total agitation at points 19 and 20 must be controlled to avoid formation of a stable emulsion within mixer 20.

The term "stable emulsion" is used herein describing and claiming this invention to mean a mixture of immiscible materials in which the heavier material, e.g., wax and aqueous solution, does not settle from the lighter material, e.g., oil-deoiling solvent solution, within five minutes.

Suitable deoiling solvents may be found in the prior art. In general, the solvent used should be immiscible with water and should be a poor solvent for solid wax at the deoiling temperature. Examples of such solvents are hydrocarbons, such as propane, butane, pentane, propene, butenes, pentenes, naphtha, gasoline, benzene and kerosene; also, thichloroethylene, methylethyl chloride, carbon tetrachloride, acetone may be used. Various mixtures of these solvents have also found favor, for example, acetonitrile-benzene mixtures and ethyl carbonate-propane mixtures.

The effluent from mixer 20 is passed to a settler 21 where the wax and aqueous solution settle together and separately from the solution of oil in the solvent. Solvent and oil can then be separated in stripper 22.

The wax and aqueous solution are removed from settler 21 and heated by heater 23 to a temperature of about 125° F. Wax settles from the aqueous surface active agent solution in settler 24. Traces of solvent which remain associated with the wax may be stripped therefrom in stripper 25.

Figure 2 illustrates a deoiling process utilizing this invention in a three-stage system employing countercurrent flow of deoiling solvent and wax. The first stage is equipped with mixer 26 and settler 27, the second stage with mixer 28 and settler 29, and the third stage with mixer 30 and settler 31.

The wax-containing aqueous phase from the dewaxing process, with dewaxed oil in the continuous phase, enters at 32 and is agitated sufficiently by agitator 33 to cause the aqueous solution to assume the continuous phase prior to supply to first stage mixer 26. In many cases the aqueous solution will then remain in the continuous phase throughout the three-stage process. If, however, the aqueous solution should again assume the disperse phase between stages, additional agitation may be provided at 34 and 35. After the mixture has passed the last stage it enters a system, identical with that of Figure 1, in which wax and aqueous solution are separated.

Figure 3 illustrates another form of three-stage deoiling process utilizing this invention. The process of Figure 3 employs fresh solvent from location 36 in each stage, rather than utilizing countercurrent flow of solvent and wax, as in the process of Figure 2. Initial agitation to cause the aqueous solution to go from the disperse to the continuous phase is provided at 33. Additional agitation may be provided between stages at 34 and 35, if desired, to provide aqueous solution in the continuous phase for each stage.

*Table 1*

| Run No. | 1 | 2 | 3 | 4 | 5 | 6 | 7 | 8 |
|---|---|---|---|---|---|---|---|---|
| Dewaxing operation: | | | | | | | | |
| Solvent/charge, volume ratio | 3.5 | 3.5 | 3.5 | 3.5 | 3.5 | 3.5 | 3.5 | 3.5 |
| Aqueous solution/charge, volume ratio | 0.65 | 0.65 | 0.71 | 0.71 | 0.70 | 0.70 | 0.70 | 0.70 |
| Oily wax produced— | | | | | | | | |
| Oil, percent weight | 16.3 | 16.3 | | | 19.2 | 19.2 | 19.2 | 19.2 |
| Melting point, °F | 125.4 | 125.4 | | | 126.2 | 126.2 | 126.2 | 126.2 |
| Deoiling operation: | | | | | | | | |
| Preagitation— | | | | | | | | |
| Time min | None | [1]1 | None | [1]1 | None | None | 1 | 0.5 |
| Revolutions per minute of stirrer | | 700 | | 700 | | | 700 | 700 |
| Stages | 4 | 4 | 4 | 4 | 1 | 1 | 1 | 1 |
| Solvent/wax, volume ratio | 3.5 | 3.5 | 3.5 | 3.5 | 3.5 | 3.5 | 3.5 | 3.5 |
| Agitation with solvent— | | | | | | | | |
| Time, min | 1 | 1 | 1 | 1 | 1 | 2 | 1 | 1 |
| Revolutions per minute of stirrer | 700 | 700 | 700 | 700 | 700 | 700 | 700 | 700 |
| Deoiled wax— | | | | | | | | |
| Oil, percent weight | 3.8–4.0 | 2.1–2.4 | 3.7–4.5 | 1.5 | 13.0 | 11.8 | 12.1 | 10.5 |
| Melting point, °F | 130.7–131.4 | 131.9 | 129.7–131.7 | 132.9 | 126.4 | 128.4 | 128.8 | 129.5 |

[1] Before each of stages 1 and 2.

Table I tabulates the results of various tests which illustrate the advantages of this invention over the prior art. In all of these runs the wax-containing mixture was produced from dewaxing a ketone slack wax by the process described and claimed in U.S. Patent No. 2,645,597. A solvent, consisting of 48 percent by volume of benzene, 40 percent by volume of methyl-ethyl ketone and 12 percent by volume of toluene, was used in both the dewaxing and deoiling operations. The aqueous solution was 60 percent by volume water and 40 percent by volume ethylene glycol. In each 50 cubic centimeters of this solution there were dissolved 3 grams of a mixed surface active agent consisting of three parts by weight of 1–14 stock wax phenol sodium sulfonate to one part of 0.67–14 stock phenol sodium sulfonate.

Comparison of the results of run 1 with those of run 2, as well as the results of runs 3 with 4 and 5 with 8, clearly shows the advantages to be obtained by agitation of the wax-containing aqueous phase prior to contacting it with the deoiling solvent. These runs show that preagitation in the situations tested improved the oil content of the wax up to 63 percent over deoiling without preagitation.

The degree of such preagitation should, as previously stated, be sufficient to cause the aqueous solution to go from the dispersed to the continuous phase. The preagitation should not be so great, however, that when the wax-containing aqueous phase later is mixed with solvent a stable emulsion is formed. Runs 6, 7 and 8 of Table 1 illustrate the undesirable effects of overagitation. It will be noted that the oil content of the wax products of run 7 was not much better than that of run 6, even though preagitation was used. This was due to excessive preagitation which resulted in the deoiling solvent and wax-containing phase forming a stable emulsion when agitated together. When the amount of preagitation was decreased in run 8, the expected improvement in the deoiled wax was noted.

It will be appreciated that the amount of agitation of the wax-containing aqueous phase prior to subjecting it to the deoiling solvent which will give the improved results herein detailed, cannot be numerically defined. It will vary with the particular solvent, oil, wax and aqueous solution used. It is certain, however, that it must be sufficient to cause the aqueous solution to be converted from an aggregate of droplets into the continuous phase. This can routinely and easily be determined for each specific system with which it is desired to use this invention. The amount of agitation satisfactory for 100–200 cubic centimeter samples with varying amount of aqueous solution is indicated in Table I.

It will be apparent to those skilled in the art, that the agitation necessary to effect the desired inversion of phases can be determined accurately by examination of a sample of the material under treatment with a transmitted light compound microscope. Thus, a drop from a small sample taken with a pipette can be dropped onto a glass slide, a coverglass is placed thereover, and the slide is then examined at a magnification of, for example, 300 diameters. The difference in color between the phases will readily indicate whether or not the desired inversion of the phases has occurred. This, of course, will determine whether on not the agitation treatment should be continued or should be stopped.

This invention should be understood to cover all changes and modifications of the examples of the invention herein chosen for purposes of disclosure which do not constitute departures from the spirit and scope of the invention.

I claim:

1. In a process for separating oil from wax in an oil-wax mixture, wherein a dewaxing solvent is added to the oil-wax mixture together with an aqueous solution of a surface active agent to produce a wax-containing aqueous phase that includes an aggregate of droplets of aqueous solution bearing wax particles on the surfaces thereof dispersed in an oil phase, the improvement which comprises: subjecting said wax-containing aqueous phase to agitation without deoiling solvent present to produce a mixture in which said aqueous solution is the continuous phase and said oil phase is the dispersed phase, said agitation being insufficient to produce a stable emulsion; contacting the mixture produced by said agitation with a deoiling solvent to produce a mixture of deoiled wax, aqueous solution and an oil-deoiling solvent solution; separating said deoiled wax and aqueous solution from said oil-deoiling solvent solution to produce a deoiled wax-aqueous solution mixture; and separating said deoiled wax from said aqueous solution.

2. The process for deoiling the wax that is present in a dispersion in which wax particles are associated with droplets of an aqueous solution that are dispersed in a continuous oil phase, which comprises: subjecting said dispersion to agitation without deoiling solvent present to produce a mixture in which said aqueous solution is the continuous phase and said oil phase is the dispersed phase, said agitation being insufficient to produce a stable emulsion; contacting said mixture with a deoiling solvent to produce a mixture of deoiled wax, aqueous solution and oil-deoiling solvent solution; separating said deoiled wax and aqueous solution from said oil-deoiling solvent solution to produce a deoiled wax-aqueous solution mixture; and separating said deoiled wax from said aqueous solution.

3. In a process for separating oil from wax in an oil-wax mixture, wherein a dewaxing solvent is added to the oil-wax mixture together with an aqueous solution of a surface active agent to produce a wax-containing aqueous phase that includes an aggregate of droplets of aqueous solution bearing wax particles on the surfaces thereof dispersed in an oil phase, the improvement which comprises: subjecting said wax-containing aqueous phase to contact with a deoiling solvent in a multiplicity of stages, the wax-containing aqueous phase being supplied to the first of said stages and passing through successive stages to the last stage and the deoiling solvent being supplied to the last stage and passing through successive stages to the first stage countercurrently to the flow of the wax and at least prior to the first stage subjecting the wax-containing aqueous phase to agitation, without deoiling solvent present, sufficient to produce a mixture in which said aqueous solution is the continuous phase and said oil is the dispersed phase but insufficient to produce a stable emulsion.

4. The process of claim 3 in which each stage of the contacting comprises a step in which deoiling solvent is agitated with the wax-containing aqueous solution and a step in which the wax-containing aqueous solution is separated from deoiling solvent and prior to each of the stages the wax-containing aqueous solution is agitated, without a substantial quantity of deoiling solvent present, in sufficient quantity to produce as feed to each stage a mixture in which said aqueous solution is the continuous phase and said oil phase is the dispersed phase but insufficient to form a stable emulsion.

5. The process of claim 4 in which fresh deoiling solvent is supplied to each stage and the used solvent from each stage is removed from the system.

References Cited in the file of this patent

UNITED STATES PATENTS

| | | |
|---|---|---|
| 2,302,430 | Dons et al. | Nov. 17, 1942 |
| 2,645,597 | Myers et al. | July 14, 1953 |
| 2,670,318 | Halamka et al. | Feb. 23, 1954 |
| 2,721,829 | Mondria | Oct. 25, 1955 |
| 2,748,056 | Backlund et al. | May 29, 1956 |
| 2,791,539 | Mondria et al. | May 7, 1957 |